Feb. 7, 1928.
R. M. ROBINSON
1,658,741
AUTOMATIC INTERLOCKING SYSTEM
Filed July 31, 1922
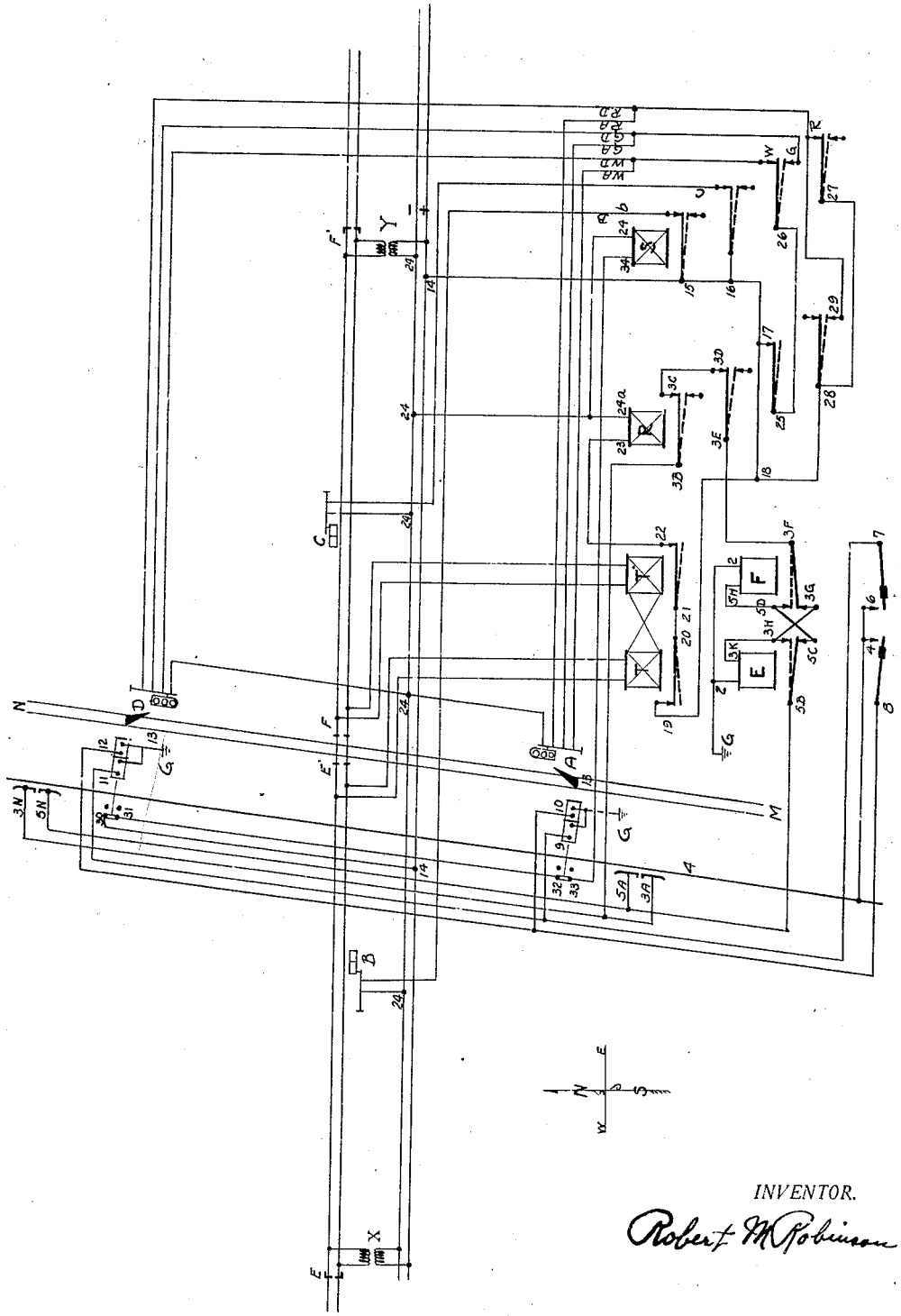
INVENTOR.
Robert M Robinson Patented Feb. 7, 1928.

1,658,741

UNITED STATES PATENT OFFICE.

ROBERT M. ROBINSON, OF LOUISVILLE, KENTUCKY, ASSIGNOR TO CHEATHAM ELECTRIC SWITCHING DEVICE COMPANY, OF LOUISVILLE, KENTUCKY, A CORPORATION OF KENTUCKY.

AUTOMATIC INTERLOCKING SYSTEM.

Application filed July 31, 1922. Serial No. 578,694.

The object of my invention is to provide protection for cars and interurban cars in making grade crossings of steam railroads, so that it will be impossible for an electric car to cross a steam road without having first placed stop signals on each side of the crossing, to be observed by the engineman of the steam railroad, and also closed or reversed derails on electric railway for operation across tracks of the steam railroad. And a further object is to provide a reliable apparatus whereby a signal on the steam road cannot show "Proceed" unless derail switches on electric lines are in normal derail position. These and other objects are accomplished by my invention, one embodiment of which is hereinafter more particularly set forth.

For a more particular description of my invention, reference is to be had to the accompanying drawings, forming a part thereof, in which The figure is a complete diagrammatic description of the circuits disclosed in this application.

Symbols A and D represent three-position color light signals indicating by lights behind red, white, or green hooded lenses. Symbols B and C represent two-position semaphore signals. E E', F F' represent track circuits on the steam road fed from 110 volt supply line thru transformers X and Y. Z Z' represents 110 volt A. C. supply line. 11—12 represents the switching machine attached to derail switch at D. 30—31 represents circuit controller attached to same switching machine. 9—10 represents switching machine attached to derail switch at A. 32—33 represents circuit controller attached to same switching machine. $3^A$—$5^A$, and $3^N$—$5^N$ represent directional contactors mounted on trolley wire on electric railway. Relay T T' is an interlocking track relay of standard design. Relay E—F is a directional interlocking relay with magnetic blowout contacts. Relays R and S are neutral relays of standard design. Signals B and C on steam road normally indicate "Proceed". Signals A and D on electric road indicate "Normal stop" (red signal light modified by white signal light). The meaning of this signal is that operator of electric car may proceed with care thru contactor, but must not pass the signal, unless signal registers a change from "Normal stop" to "Proceed" as trolley of electric car passes contactor. The derails are both normally in the open position, so that electric car cannot reach crossing without first having closed them.

A trolley wheel in passing from left to right bridges from $5^A$ strip to trolley wire 4, current flows from 4 to $5^A$, to armature $5^B$ of coil E, to back contact $5^C$ to $5^H$ thru coil F to ground, energizing coil F, which causes armature $3^F$ to be attracted to front position making contact with $5^D$, so that trolley wheel in passing from strip $5^A$ to strip $3^A$ maintains stick circuit from trolley 4 to $3^A$, to $3^F$ to $5^D$ to $5^H$ through coil F to ground. During this whole time coil F, and only coil F, has been energized. The energizing of coil F picks up armature 7 also, which makes contact with terminal 6, completing circuit from trolley 4 to 6, to 7 to 9 to ground thru coil marked N.

In traversing contactor from right to left, trolley wheel first makes bridging contact from strip $3^A$ to trolley 4, completing circuit from 4 to $3^A$, to $3^F$, to $3^G$, to $3^K$, thru coil E, to ground, energizing coil E, and attracting armature $5^B$, so that in passing from strip $3^A$ to $5^A$ trolley wheel makes bridging contact from 4 to $5^A$, to $5^B$, to $3^H$, thru coil E to ground. During the period of this complete passage of contactor, coil 10 has been energized due to the fact that armature 8 has been attracted while E was energized to make contact with 5, completing circuit from 4 to 8, to 10, to ground thru coil 10.

In the embodiment of my invention herein illustrated is one power operated derailing device placed on electric road, on each side of steam road, at variable distances from crossing; one or more electrically operated signals placed on electric road, on each side of steam road; one or more electrically operated signals on steam road, on each side of electric railway crossing, and at variable distances from crossing; one or more trolley contact devices placed on trolley line on each side of the steam road crossing, at variable distances from the crossing; one circuit controller mounted within the power operated derailing device on the electric road, on each side of the crossing; one or more relay boxes located near the crossing to house the necessary relays for the operation of the interlocking system; an insulated track section on the steam road, on each side of the electric railway, extending back from the crossing a variable distance.

The operation of the interlocking system herein illustrated by the circuit diagram is forthwith described:

*I. Case of electric car traversing crossing with no steam train within protected zone.*

The operator of electric car proceeding north observes color light signal A, indicating "Normal stop" (red signal light modified by white signal light). Operator of car proceeds according to rules, "pass contactor, but do not pass signal unless signal registers a change from "Normal stop" to "Proceed" (green signal light), when trolley wheel passes contact device $3^A$—$5^A$ on trolley wire. As trolley wheel passes contact device $3^A$—$5^A$, the circuit is closed from trolley to contact strip $3^A$, is deflected thence thru wire connected thereto to armature $3^B$ of relay R, which is normally held against front contact $3^C$. Current flows from $3^B$ to $3^C$, to $3^D$, thru armature $3^E$, thru wire connected thereto to armature $3^F$ of relay E—F, thence to back contact $3^G$, to $3^H$, $3^K$, thru coil E of relay E—F, to ground, energizing coil E, which attracts armatures $5^B$ and 8 to make contacts with $3^H$ and 5, respectively. The breaking of contact of armature $5^B$ with contact $5^C$, and the making of contact of the armature $5^B$ with $3^H$ so changes the circuits of the interlocking relay EF that when the trolley wheel passes from strip $3^A$ to $5^A$, current is deflected from trolley to contact strip $5^A$, thence by means of wire attached thereto to armature $5^B$ of relay E—F, which is in the front position, and is making contact with $3^H$, as described above, thru $3^H$ to $3^K$, thru coil E of relay E—F to ground, which holds coil E energized during the entire time that car is passing trolley contactor $3^A$—$5^A$ going north. During this time armature 8 is held picked up, and making contact with contact 5, which is connected by wire direct to trolley. Closing of the contact between armature 8 and contact 4 completes the circuit thru the reverse magnets marked "R" of the switching machine 9—10, and also switching machine 11—12 to ground. The energizing of these magnets attracts the armature of each switching machine, which is connected to derail switch, and reverses both derails to the closed position; also opens circuit controller contacts 30—31, and 32—33, the opening of these circuit controller contacts opens the circuit, which is normally closed, from the 110 volt A. C. supply line, starting at 24, from thence to $24^B$ on the relay S, thru coil S, thru terminal 34, thru circuit controller 33—32, thence thru circuit controller 31—30, thence to return A. C. line at 14. The opening of the circuit thru this relay S de-energizes same, and causes armature of same to drop to the back position, as shown by dotted lines. The dropping of these armatures opens the normally closed circuit from 14 to armature 15 of relay S, to signal B, and return to 24 of the 110 V. A. C. supply line; also circuit 14 to armature 16 of relay S, to signal C, thence to 24 of the 110 volt A. C. supply line. These two circuits are normally closed, and supply the energy whereby the semaphore signals are held in the normal "Proceed" position. The opening of these supply lines allows arms of both signals B and C to drop to the "Stop" position. The dropping of armatures 26 and 27 of relay S extinguishes the red and white lights burning normally in signals A and D by removing the power source thereto, and closes the circuit from the power source at 14 up to front contact 17 on relay R, thru armature 25, thence thru armature 26 of relay S, thru contact G, thence to signals A and D to energize the green lights in said signals. The change in aspect of color light signal A from "Normal stop" to "Proceed" is observed by operator of electric car, which notifies him immediately that "Stop" signals have been placed on steam road, and that derails have been reversed for straight line operation. Car proceeds across steam road tracks, then passes over derail at D, after which trolley wheel makes bridging contact on passing contactor $5^N$—$3^N$, so that current is deflected from trolley to contact strip $5^N$, thence to armature $5^B$ of relay E—F, thru back contact $5^C$ to $5^D$, to $5^H$, to coil F, and to ground, energizing coil F, which attracts its armatures $3^F$ and 7. The changing of armature $3^F$, from back position and contact with $3^G$, to the front position and contact with $5^D$, changes the circuits of the relay E—F, so that in passing from contact strip $5^N$ to contact strip $3^N$ current is deflected from trolley to strip $3^N$, thence by means of wire connected thereto to armature $3^B$ of relay R, to front contact $3^C$, to contact $3^D$, thru armature $3^E$, to armature $3^F$ of relay EF, to contact $5^D$, to $5^H$, thru coil F to ground. During this time armature 7 has remained picked up making contact with 6, which is connected directly to trolley. The making of this contact closes circuit from trolley thru coils marked N of switching machine 9—10, and 11—12 to ground, energizing same, which causes armatures to be attracted thereto, causing derail switches to be returned to the normal open position, and closing circuit controller contacts 32—33, and 30—31. The closing of said circuit controller contacts completes circuits thru relay S, as previously described, which relay, being energized, attracts its armatures 15, 16, 26 and 27, extinguishing the "Proceed" signals on the electric line, and establishing the "Normal stop" signal on electric line; also restoring the hold-clear circuits B and C to signals B and C, respectively, which changes signals B and C from "Stop" to "Normal proceed" position.

The operation is symmetrically the same in the case of a car proceeding south instead of north.

*II. Case of steam train approaching crossing going east with no electric car in protected zone.*

Train enters track section E E', shunting out coil T of interlocking track relay T T'. The de-energization of coil T drops armature 20, breaking contact with 19, thereby opening the circuit from 110 volt A. C. supply line at 14 to 15, 16, 17, 18, 19, 20, 21, 22, 23, 24. The breaking of this circuit de-energizes neutral relay R, causing armatures to drop from front to back position. The dropping of armature 25 breaks the feed circuit to the white lights in signals A and D, changing the aspects of same from "Normal stop" (red light modified by white light) to "Stop and stay" (red light only). The dropping of armature 28 merely completes the multiple path from the 110 volt line to the red light circuit, as follows: 14, 15, 16, 17, 18, 28, 29, R to RD and RA in multiple to 24. The dropping of armatures 3$^E$ and 3$^E$ opens the contactor control circuit, so that even should the operator of electric car attempt to violate signals and traverse crossing it would be impossible to reverse derail by passing either contactor 3$^A$—5$^A$, or 3$^N$—5$^N$. The steam train is now on the track section, and engineer observes that signal B still indicates "Proceed", meaning that derails have been locked in open position, and that signals on electric line indicate "Stop and stay". Train proceeds across electric railway, and on passing out of track section E E' into section F F', the armature of coil T' of relay T T' is dropped, but as train clears section E E' armature 20 is picked up as coil T is energized, and, by virtue of the mechanical construction of relay T T', pushes armature 21 up to make contact with 22. As train leaves section F F' coil T' is energized again, causing the interlock lever to drop, and relay T T' is again normal. After the train had straddled the crossing, and armature 20 had picked up, pushing up armature 21, the circuit was closed thru relay R, as previously described, energizing same, and causing armatures to be changed from back contacts to front contacts, thereby restoring the signals on electric railway to "Normal stop."

The operation is symmetrically the same in the case of a train proceeding west instead of east.

*III. Case of interference where a steam train enters track circuit section going east at exactly the same time that electric car passes contactor 3$^A$—5$^A$ going north.*

The operation of the relays used in this equipment is so nearly instantaneous that it would be practically impossible to obtain simultaneous interference between the two movements. If the coil T of track relay T T' would drop first, the electric car would not receive its "Proceed" signal on passing contactor 3$^A$—5$^A$, and would stop before reaching the derails. If, on the other hand, train entered track section an instant after electric car passed contactor 3$^A$—5$^A$, the passing of the contactor 3$^A$—5$^A$ would have caused the reversing of the derails, and the electric car would have received a "Proceed" signal, and would have placed "Stop" signals on steam road, but as the steam train entered the track circuit section the dropping of armature 20 of relay T T' would open the circuit of relay R, thereby removing "Proceed" signals from electric line, and placing "Stop and stay" signals in their stead, whereby the interference would cause the stopping of both the electric car and the steam train. It will be necessary for the operator of either the electric car or the steam train to be flagged across crossing, after which the signal on the other road would return to "Proceed" allowing that road to proceed across, after which the plant would be returned to normal. Both the electric car and the steam train would have been stopped by virtue of the interference, but an accident would have been prevented.

While I have shown and described only one embodiment of my invention it is obvious that it is not restricted there to, but is broad enough to embrace all forms that come within any of the annexed claims.

Having thus described my invention what I claim is:

1. In combination, a railroad track having two insulated sections separated by a short insulated track portion, a trolley track intersecting said portion signals for said railroad track and trolley track, a track circuit for each of said sections comprising a source of current and a track relay adapted to be short circuited by the passage of a train, said track relays having their armatures interlocked to permit signals on the trolley track to clear upon the clearing of the approach section by a train in either direction on the railroad track, derails in said trolley track, and means controlled by said relays and derails for giving signals and operating said derails.

2. In combination, a railroad track having two insulated sections separated by a short insulated track portion, a trolley track intersecting said portion signals for said railroad track and trolley track, a track circuit for each of said sections comprising a source of current and a track relay adapted to be short circuited by the passage of a train, derails in said trolley track and means controlled by said track relays and derails for operating said signals.

3. In combination, a railroad track having two insulated sections separated by a short insulated track portion, a trolley track intersecting said portion, a track circuit for each of said sections comprising a source of current and a track relay adapted to be short circuited by the passage of a train, derails in said trolley track, means for operating said derails, a trolley wire, trolley wheel contactors thereon and circuits including said contactors and controlled by said track relays for controlling said derail operating means.

4. In combination, a railroad track having two insulated sections separated by a short insulated track portion, a trolley track intersecting said portion, a track circuit for each of said sections comprising a source of current and a track relay adapted to be short circuited by the passage of a train, derails in said trolley track, means for operating said derails, a trolley wire for said trolley track, contactors thereon for a trolley wheel, circuits including said contactors for actuating said derail operating means and means controlled by said track relays controlling said contactor circuits.

5. In combination, a railroad track having two insulated sections separated by a short insulated track portion, a trolley track intersecting said portion, a track circuit for each of said sections comprising a source of current and a track relay adapted to be short circuited by the passage of a train, derails in said trolley track, means controlled by said track relays for operating said derails, a trolley wire, contacts upon said wire adapted to cooperate with a trolley wheel to control circuits for actuating said derail operating means and signals for said trolley track also controlled by said track relays.

6. In combination, a railroad track having insulated sections separated by a short insulated track portion, a trolley track intersecting said portion, a track circuit for each of said sections comprising a source of current and a track relay adapted to be short circuited by the passage of a train, derails in said trolley track, means controlled by said track relays for operating said derails, a trolley wire, contacts upon said wire adapted to cooperate with a trolley wheel to control circuits for actuating said derail operating means, signals for said trolley track controlled by said track relays, circuit controllers operated by said derails and signals for said railroad track operated by said circuit controllers.

7. In combination, a railroad track having two insulated sections separated by a short insulated track portion, a trolley track intersecting said portion, a track circuit for each of said sections comprising a source of current and a track relay adapted to be short circuited by the passage of a train, derails for said trolley track, means for operating said derails, a trolley wire, contactors carried thereby, a circuit including each contactor for operating said derail operating means and a stick circuit including said contactors for maintaining said derail operating means operative.

In testimony whereof, I hereunto set my hand this 26th day of July, 1922.

ROBERT M. ROBINSON.